United States Patent [19]
Wickert et al.

[11] Patent Number: 5,855,257
[45] Date of Patent: Jan. 5, 1999

[54] DAMPER FOR BRAKE NOISE REDUCTION

[75] Inventors: Jonathan A. Wickert, Allison Park; Adnan Akay, Sewickley, both of Pa.

[73] Assignee: Chrysler Corporation, Auburn Hills, Mich.

[21] Appl. No.: 761,879

[22] Filed: Dec. 9, 1996

[51] Int. Cl.⁶ ............................................. F16D 65/10
[52] U.S. Cl. .............................. 188/218 XL; 188/218 A
[58] Field of Search ........................... 188/18 A, 218 A, 188/218 R, 218 XL; 74/574

[56] References Cited

U.S. PATENT DOCUMENTS

| | | |
|---|---|---|
| 1,745,301 | 1/1930 | Johnston . |
| 1,791,495 | 2/1931 | Frey . |
| 1,927,305 | 9/1933 | Campbell . |
| 1,946,101 | 2/1934 | Norton . |
| 2,012,838 | 8/1935 | Tilden . |
| 2,081,605 | 5/1937 | Sinclair . |
| 2,197,583 | 4/1940 | Koeppen et al. . |
| 2,410,195 | 10/1946 | Baselt et al. . |
| 2,506,823 | 5/1950 | Wyant . |
| 2,639,195 | 5/1953 | Bock . |
| 2,702,613 | 2/1955 | Walther, Sr. . |
| 2,764,260 | 9/1956 | Fleischman . |
| 2,897,925 | 8/1959 | Strohm . |
| 2,941,631 | 6/1960 | Fosberry et al. .................. 188/218 A |
| 3,250,349 | 5/1966 | Byrnes et al. . |
| 3,286,799 | 11/1966 | Shilton ............................. 188/218 A |
| 3,292,746 | 12/1966 | Robiette . |
| 3,368,654 | 2/1968 | Wegh et al. . |
| 3,435,925 | 4/1969 | Harrison . |
| 3,934,686 | 1/1976 | Stimson et al. . |
| 4,043,431 | 8/1977 | Ellege ............................... 188/218 A |
| 4,656,899 | 4/1987 | Contoyonis . |
| 5,004,078 | 4/1991 | Oono et al. . |
| 5,383,539 | 1/1995 | Bair et al. . |

FOREIGN PATENT DOCUMENTS

| | | |
|---|---|---|
| 123707 | 7/1931 | Australia . |
| 2275692 | 1/1976 | France .......................... 188/218 A |
| 58-72735 | 4/1983 | Japan . |
| 63-308234 | 12/1988 | Japan . |
| 141236 | 9/1984 | Rep. of Korea ................ 18/218 A |
| 254561 | 9/1925 | United Kingdom ............ 188/218 A |
| 708083 | 10/1952 | United Kingdom . |
| 857043 | 12/1960 | United Kingdom ............ 188/218 A |
| 934096 | 8/1963 | United Kingdom ............ 188/218 A |
| 2181199 | 4/1987 | United Kingdom . |
| 2181802 | 4/1987 | United Kingdom . |

*Primary Examiner*—Robert J. Oberleitner
*Assistant Examiner*—Chris Schwartz
*Attorney, Agent, or Firm*—Roland A. Fuller, III

[57] ABSTRACT

An apparatus for reducing unwanted brake noise has a ring damper affixed around a periphery of a brake rotor in a disk brake system in a manner that permits relative motion and slippage between the ring damper and the rotor when the rotor vibrates during braking. In a preferred embodiment, the ring damper is disposed in a groove formed in the periphery of the disk and is pre-loaded against the rotor both radially and transversely. The ring damper is held in place by the groove itself and by the interference pre-load or pretension between the ring damper and the disk brake rotor.

30 Claims, 4 Drawing Sheets

DAMPER FOR BRAKE NOISE REDUCTION

This invention relates to brake noise reduction, and more specifically, to the use of dampers affixed to brake rotors in disk brake systems to reduce brake noise during the braking process.

BACKGROUND

Disk brakes are commonly used in automobiles, trucks, buses, off-road and construction vehicles, aircraft, and light rail vehicles. In the disk brake type of braking system, a disk or rotor turns with the vehicle's wheel. When the brakes are applied, stationary (i.e., non-rotating) brake pads are pressed against the rotor under high hydraulic pressure by a brake caliper. The frictional forces between the brake pads and the rotor bring the vehicle wheel to a stop.

A common problem associated with brake systems is that unwanted noise and vibration are often generated during the braking process. This unwanted noise is a frequently recurring problem that causes numerous customer complaints and significant warranty expenditures on the part of motor vehicle manufacturers.

It is an object of this invention to reduce brake noise.

It is a further object of this invention to reduce unwanted brake noise by the use of a simple damping arrangement that minimizes the amount of additional forming operations required in the manufacture of the brake system.

It is another object of this invention to provide a ventilated disk brake rotor with improved vibration and noise damping characteristics.

It is another object of this invention to provide a disk brake rotor with noise and vibration damping members that are cooled along with the disk brake rotor.

SUMMARY

An apparatus and method of reducing unwanted brake noise in accordance with this invention is a ring damper that is affixed to a brake rotor in a disk brake system in a manner that permits relative motion and slippage between the ring damper and the rotor when the rotor vibrates during braking. In one preferred embodiment, the ring damper is an almost circular ring that is inserted in a groove formed along either the inner or outer periphery of the disk of the disk brake rotor. The ring damper can also be a set of rings; a multiple-wrap spiral shaped ring; or a wave shaped ring. The ring damper is held in place by the groove itself and by the interference pre-load or pre-tension between the ring damper and the disk brake rotor.

In a preferred embodiment, the ring damper is pre-loaded against the rotor both transversely and radially, preferably by means of elastic deformation of the ring damper. In the case where the ring damper comprises multiple damping elements, the damping elements are pre-loaded against each other and the rotor by elastic deformation of a structural member which also forms one of the damping elements. This renders rotor-to-damper pre-load insensitive to rotor and/or damper dimensional variations that arise from thermal expansion and distortion, manufacturing tolerances, and rotor vibration. In another preferred embodiment where the ring damper is a wave shaped ring, the pre-load is established by elastic deformation of the wave ring, which also provides damping.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

DETAILED DESCRIPTION

Figure 1:
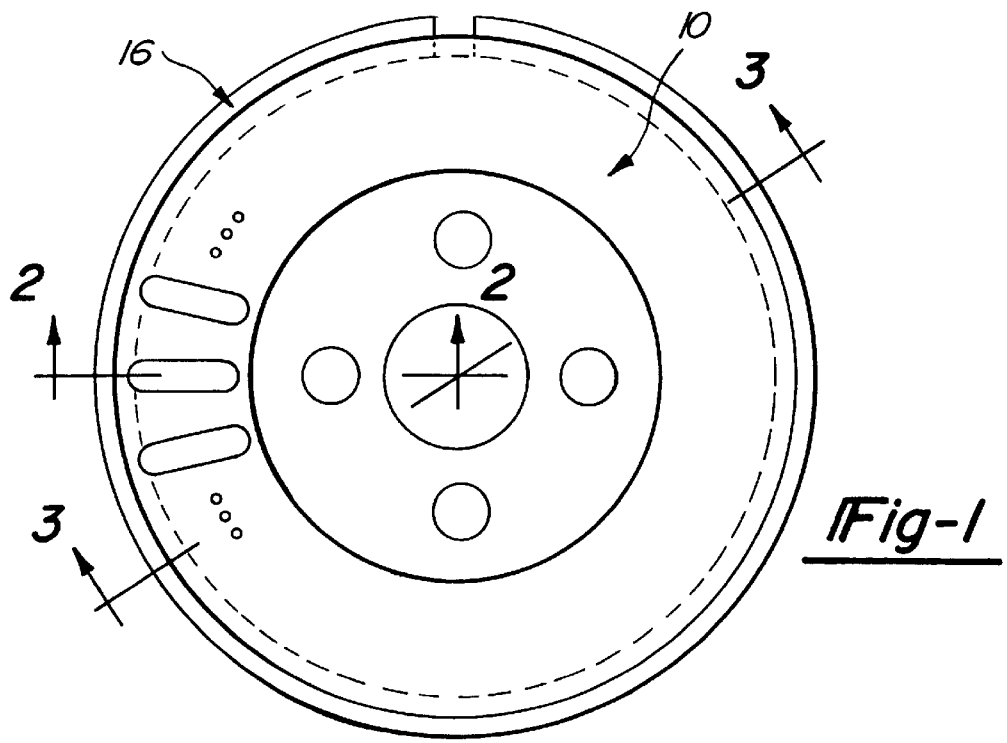
FIG. 1 is a side view of a disk brake rotor having a ring damper in accordance with this invention.
Figure 2:
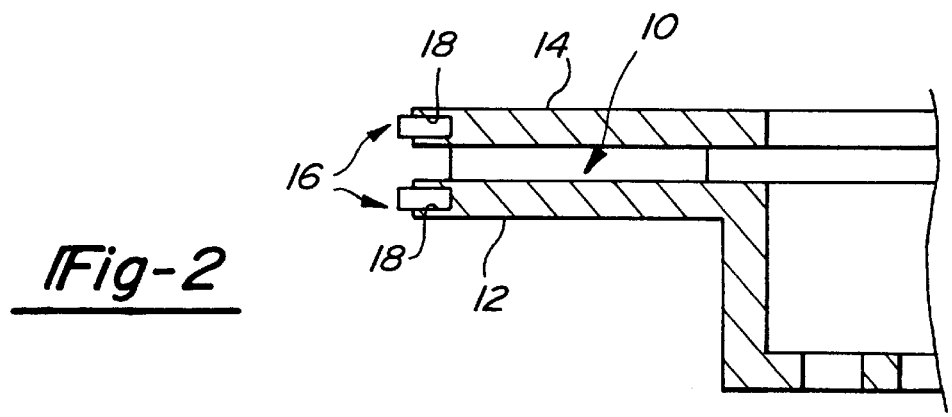
FIG. 2 is a section view of the disk brake rotor of FIG. 1 taken along the line 2—2 of FIG. 1.
Figure 4:
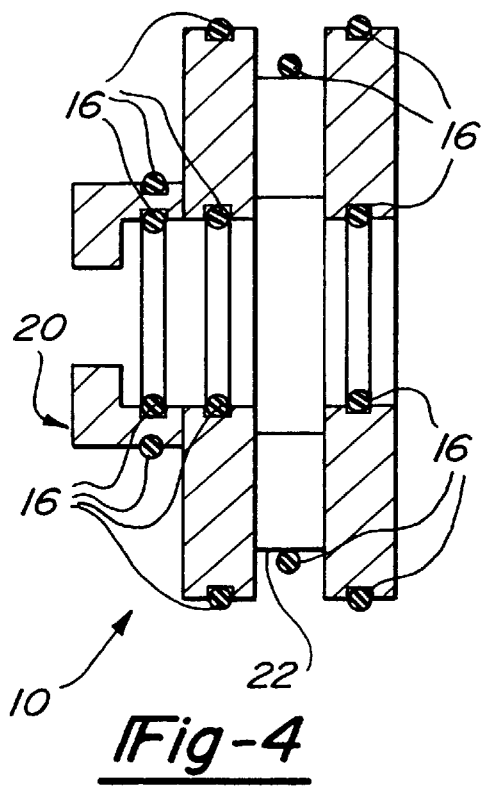
FIG. 4 is a section view of the disk brake rotor of FIG. 1 taken along the line 3—3 of FIG. 1.

Referring to FIGS. 1 and 2, a disk brake rotor 10, illustratively a ventilated rotor, has outer and inner disks 12, 14, respectively, separated by a web 22 of cooling fins (FIG. 4). Each of inner and outer disks 12, 14 has an outer periphery with a groove 18 formed therein. A ring damper 16 is affixed to the outer periphery of each disk 12, 14, in the groove 18 of that disk in a manner that permits relative motion and slippage between each ring damper and disk when the rotor vibrates during braking. Illustratively, each ring damper 16 is a split ring which is received in each groove 18 and held therein by the groove and the interference pre-load or pre-tension between ring damper 16 and disk brake rotor 10. Ring damper 16 is preferably configured so that it is pre-loaded against the disk brake rotor 10 both radially and transversely. Alternative configurations for ring damper 16 are shown in FIGS. 9a–9f, 10a–10c, and 11, and discussed below.

In operation, when brake rotor 10 vibrates, such as occurs during braking, there is relative motion and slippage between each ring damper 16 and rotor 10. As a result, vibration energy of the rotor 10 is damped or dissipated due to friction at the ring-to-rotor interface. Ring damper 16 reduces three-dimension vibration of rotor 10, that is, both bending vibration and in-plane vibration. Reduction of both bending and in-plane vibration is thought necessary to control the mechanisms for both the generation and radiation of brake squeal or groan, a common form of brake noise.

Figure 3:
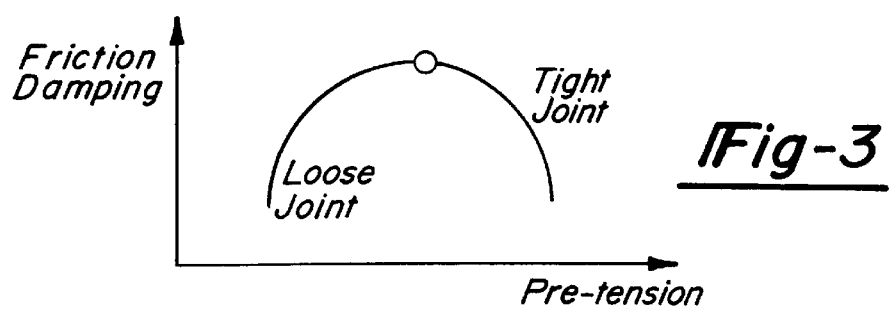
FIG. 3 is a graph showing the relationship between pre-tension of the ring damper and friction damping.

It is important that each ring damper 16 be affixed to rotor 10 with the proper pre-loading or pre-tension. Ring damper 16 must be affixed to rotor 10 with sufficient pre-loading so that it will damp the vibration of rotor 10 during braking but not so tight that it in effect becomes part of rotor 10. If ring damper 16 is affixed to rotor 10 too tightly, it will in effect act as part of rotor 10 and vibrate with rotor 10 rather than damp the vibration of rotor 10. If ring damper 16 is affixed too loosely to rotor 10, it will not interact with rotor 10 when rotor 10 vibrates and thus not damp the vibration of rotor 10. FIG. 3 shows what is thought to be the proper relationship between the pre-tension at which ring damper 16 is affixed to rotor 10 and friction damping.

In the embodiment shown in FIGS. 1 and 2, two ring dampers 16 are used, one affixed to the periphery of outer disk 12 and the other affixed to the periphery of inner disk 14. However, one or more ring dampers 16 can be used, and can be affixed to brake rotor 10 at locations other than the outer periphery of the disks thereof. FIG. 4 illustrates the various locations at which ring dampers 16 can be affixed to brake rotor 10. As shown in FIG. 4, ring dampers 16 can be affixed at the outer periphery of disks 12, 14 of brake rotor 10, the inner periphery of disks 12, 14, the inner periphery of hub 20 of brake rotor 10, the outer periphery of hub 20, or the outer periphery of the web 22 of cooling fins that separate inner and outer disks 12, 14.

Figure 5:
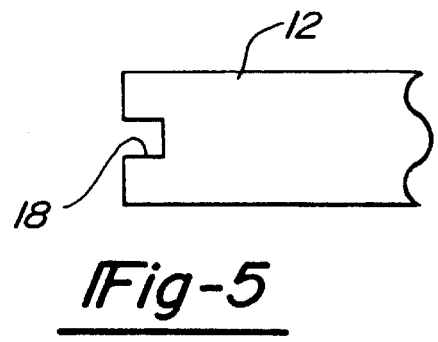
FIG. 5 is a cross-sectional view of a disk brake rotor at a peripheral edge having centrally formed groove therein for receiving a ring damper.
Figure 6:
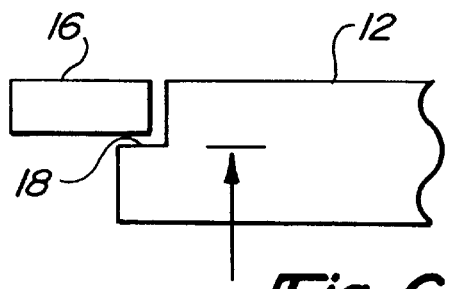
FIG. 6 is a cross-sectional view of a disk brake rotor at a peripheral edge with a ring damper affixed in a groove therein.
Figure 7:
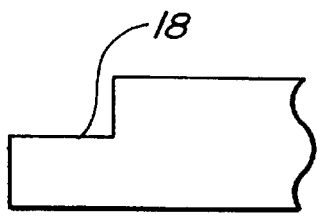
FIG. 7 is a cross-sectional view of a disk brake rotor at a peripheral edge having a deeper groove than the disk brake rotor of FIG. 5.

In the embodiment shown in FIGS. 1 and 2, grooves 18 are illustrated as being formed centrally in the periphery of outer and inner disks 12, 14, as shown more particularly in FIG. 5. However, groove 18 can also be formed at an edge of a disk, such as disk 12 in FIG. 6, rather than in the center. Moreover, groove 18 can be formed at various depths, such as is shown in FIG. 7 wherein groove 18 has a greater depth than the depth of groove 18 in FIG. 6.

Figure 8:
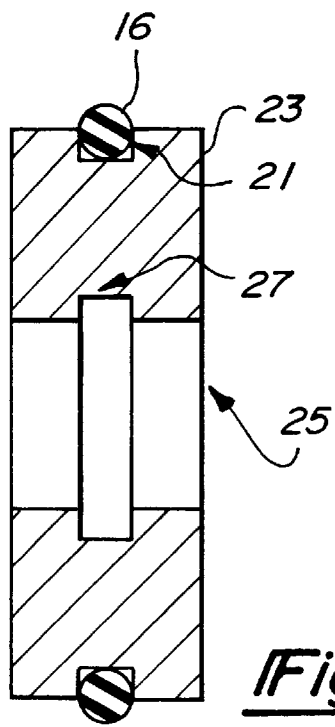
FIG. 8 is a cross-sectional view of a solid or single disk rotor having a ring damper in accordance with this invention.

While the embodiments shown in FIGS. 1, 2 and 4 are ventilated disk brake rotors having inner and outer disks 12, 14, ring damper 16 can also be used with single or solid disk rotors, in which case ring damper 16 is preferably affixed to a disk 23 of a single or solid disk rotor in a groove 21 formed in an outer periphery of the disk 23, as shown in FIG. 8. Alternatively, ring damper 16 could be affixed in a groove 27 formed in an inner periphery of disk 23.

Figure 9A:
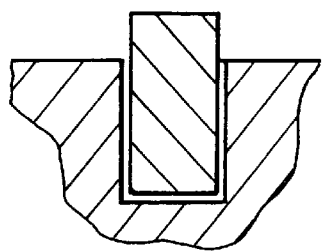
FIGS. 9a–9f are cross-sectional views of various ring damper configurations located in a central groove in accordance with this invention.
Figure 9C:
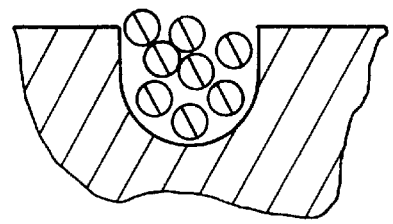
Figure 9B:
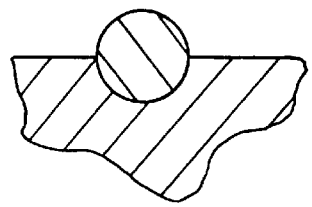
Figure 9D:
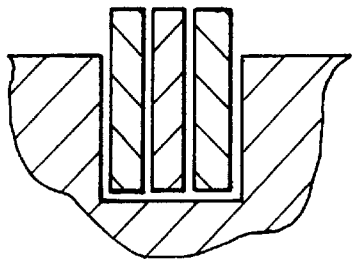
Figure 9F:
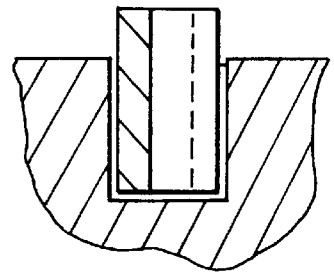
Figure 9E:
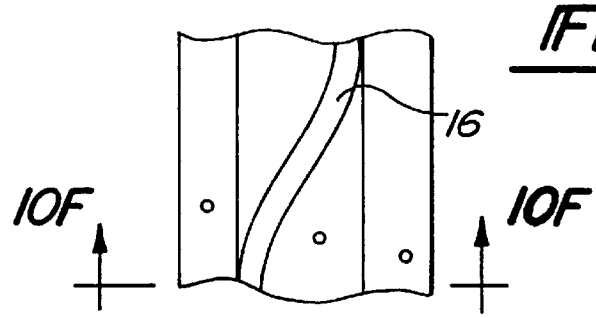
Figure 10A:
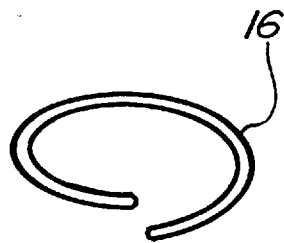
FIGS. 10a–10c are perspective views of various ring damper configurations in accordance with this invention.
Figure 10B:
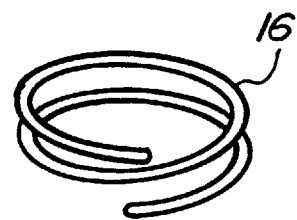
Figure 10C:
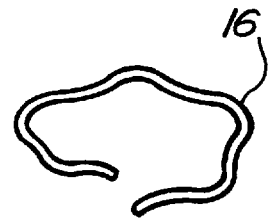

In the embodiment shown in FIGS. 1 and 2, the ring damper 16 and groove 18 are shown as having rectangular cross-sections. However, the groove 18 can be formed to have other cross-sections, such as circular (FIG. 9b) or oval (FIG. 9c). In such case, the ring damper 16 can be formed to have a cross-section similar to the cross-section of groove 18. The ring damper 16 can also comprise multiple wraps of wire (FIGS. 9c and 10b), be formed in the spiral form of a helix (FIG. 10b), or be formed in a wave pattern (FIGS. 9e, 9f and 10c) in which case the groove 18 is substantially wider than the thickness of the material of which the ring damper 16 is made and pre-load is established by elastic deformation of the wave structure of the ring damper 16 during its insertion into the groove 18.

The optimum number and location of ring dampers 16 used, the pre-loading of each, the shape of the cross-section of ring damper 16, the number of wraps around the rotor for the multiple wrap embodiment (FIGS. 9c and 10b), the shape of groove 18, the surface treatment of ring damper 16 and groove 18 to establish functional characteristics, and the material used can be determined heuristically for each type of brake rotor by one skilled in the art of brake design to optimize the damping of brake noise and vibration.

Figure 11:
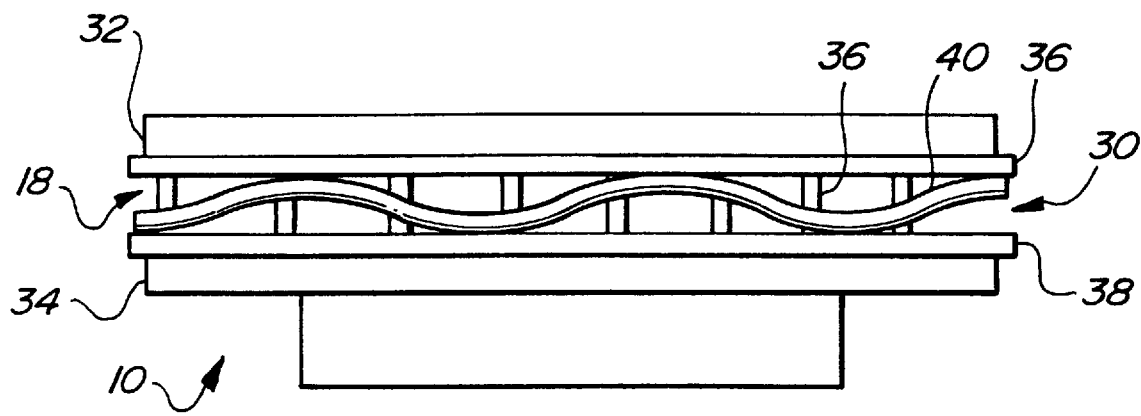
FIG. 11 is a perspective view of a multiple element ring damper in accordance with this invention.

Referring to FIG. 11, a disk brake rotor 10 having a multiple element ring damper 30 is shown. Ring damper 30 comprises first and second almost circular rings 32, 34 and a wave-shaped ring 36 sandwiched therebetween. Disk brake rotor 10 is illustratively a ventilated disk brake rotor having inner and outer disks 12, 14 with vanes 36 extending therebetween. Inner and outer disks 12, 14 define a groove 18 therebetween in which ring damper 30 is disposed. Ring damper 30 illustratively comprises first and first and second circular or almost circular rings 36, 38 with a wave-shaped ring 40 sandwiched therebetween.

Rings 36, 38 and wave-shaped ring 40 are pre-loaded against each other and against inner and outer disks 12, 14 of rotor 10 (transverse pre-loading against rotor 10) and against vanes 36 (radial pre-loading against rotor 10). The pre-load is established by elastic deformation of wave-shaped ring 40, which also provides damping. By pre-loading in this fashion, the rotor-to-damper pre-load is rendered insensitive to rotor and/or damper dimensional variations which arise due to thermal expansion and distortion, manufacturing tolerances, and rotor vibration. Vanes 34, in additional to cooling rotor 10, also cool damper 30.

Although the invention has been described in detail with reference to certain preferred embodiments and specific examples, variations and modifications exist within the scope and spirit of the invention as defined in the following claims.

What is claimed is:

1. A disk brake rotor having a ring damper affixed to a periphery of the rotor, said ring damper being transversely pre-loaded against said rotor such that said ring damper moves and slips relative to said rotor providing damping of said rotor when the rotor vibrates during braking to damp brake noise.

2. The apparatus of claim 1 wherein the rotor has a groove formed therein, the ring damper received in the groove and held therein by the groove and pre-loading between the ring damper and the rotor.

3. The apparatus of claim 2 wherein the ring damper comprises a split ring.

4. The apparatus of claim 2 wherein the ring damper is formed as a spiral helix around the periphery of the rotor.

5. The apparatus of claim 2 wherein the ring damper is formed in a wave pattern around the periphery of the rotor.

6. The apparatus of claim 2 wherein the ring damper comprises multiple wraps of wire around the periphery of the rotor.

7. The apparatus of claim 2 wherein the ring damper has a rectangular cross-section.

8. The apparatus of claim 2 wherein the ring damper has an oval cross-section.

9. The apparatus of claim 2 wherein the ring damper has a circular cross-section.

10. The apparatus of claim 2 wherein the ring damper comprises multiple rings, at least one of the multiple rings shaped so that when it is received in the groove with the other rings it elastically deforms to pre-load the multiple rings against each other and the rotor.

11. The apparatus of claim 1 wherein the disk brake rotor comprises a ventilated rotor having an inner disk and an outer disk, each of the inner and outer disks having a ring damper affixed around a periphery of that disk.

12. The apparatus of claim 11 wherein the ring damper is also radially pre-loaded against the rotor.

13. The apparatus of claim 11 wherein each disk has an outer periphery with a groove formed therein, each ring damper comprising a split ring received in the groove in the periphery of the disk which that ring damper surrounds.

14. The apparatus of claim 11 wherein each disk has an inner periphery with a groove formed therein, each ring damper comprising a split ring received in the groove in the periphery of the disk.

15. The apparatus of claim 11 wherein each disk has an inner periphery with a groove formed therein in which a ring damper is received and an outer periphery with a groove formed therein in which a ring damper is received, each ring damper comprising a split ring.

16. The apparatus of claim 1 wherein the rotor has a hub, the ring damper affixed around the periphery of the hub.

17. The apparatus of claim 16 wherein the ring damper is also radially pre-loaded against the rotor.

18. The apparatus of claim 16 wherein the hub has an outer periphery with a groove formed therein, the ring damper comprising a split ring received in the groove in the outer periphery of the hub, the ring damper held in place by the groove and pre-loading between the ring damper and the hub.

19. The apparatus of claim 16 wherein the hub has an inner periphery with a groove formed therein, the ring damper comprising a split ring received in the groove in the inner periphery of the hub, the ring damper held in place by the groove and pre-loading between the ring damper and the hub.

20. The apparatus of claim 1 wherein the rotor has at least one disk, the disk having an outer periphery with a groove formed therein, the ring damper received in the groove and held therein by the groove and pre-loading between the ring damper and the disk.

21. The apparatus of claim 20 wherein the ring damper is also radially pre-loaded against the rotor.

22. The apparatus of claim 1 wherein the rotor has at least one disk, the disk having an inner periphery with a groove formed therein, the ring damper received in the groove in the periphery of the disk and held therein by the groove and pre-loading between the ring damper and the disk.

23. The apparatus of claim 22 wherein the ring damper is also radially pre-loaded against the rotor.

24. The apparatus of claim 1 wherein the rotor has at least one disk, the disk having an inner periphery with a groove formed therein in which a ring damper is received and an outer periphery with a groove formed therein in which a ring damper is received, each ring damper held in its respective groove in the inner and outer periphery of the disk by the grooves and pre-loading between the ring damper and the disk.

25. The apparatus of claim 24 wherein the ring damper is also radially pre-loaded against the rotor.

26. The apparatus of claim 1 wherein the disk brake rotor comprises a single disk rotor, the ring damper affixed around an outer periphery of the disk at generally the center thereof.

27. The apparatus of claim 26 wherein the ring damper is also radially pre-loaded against the rotor.

28. The apparatus of claim 1 wherein the ring damper is also radially pre-loaded against the rotor.

29. A ventilated disk brake rotor having an inner disk, and outer disk, and vanes extending therebetween, the inner and outer disk defining a groove therebetween in which a ring damper is disposed, the ring damper comprising first and second opposed rings and a wave-shaped ring sandwiched therebetween, the first and second opposed rings and wave-shaped ring pre-loaded against each other and transversely against the rotor by elastic deformation of the wave-shaped ring.

30. The apparatus of claim 29 wherein the first and second opposed rings and the wave-shaped ring are also radially pre-loaded against the rotor.

* * * * *